(No Model.) 2 Sheets—Sheet 1.
W. SIMMONS & J. F. SPRAGUE.
DRAFT ATTACHMENT FOR FRYING PANS.
No. 333,894. Patented Jan. 5, 1886.
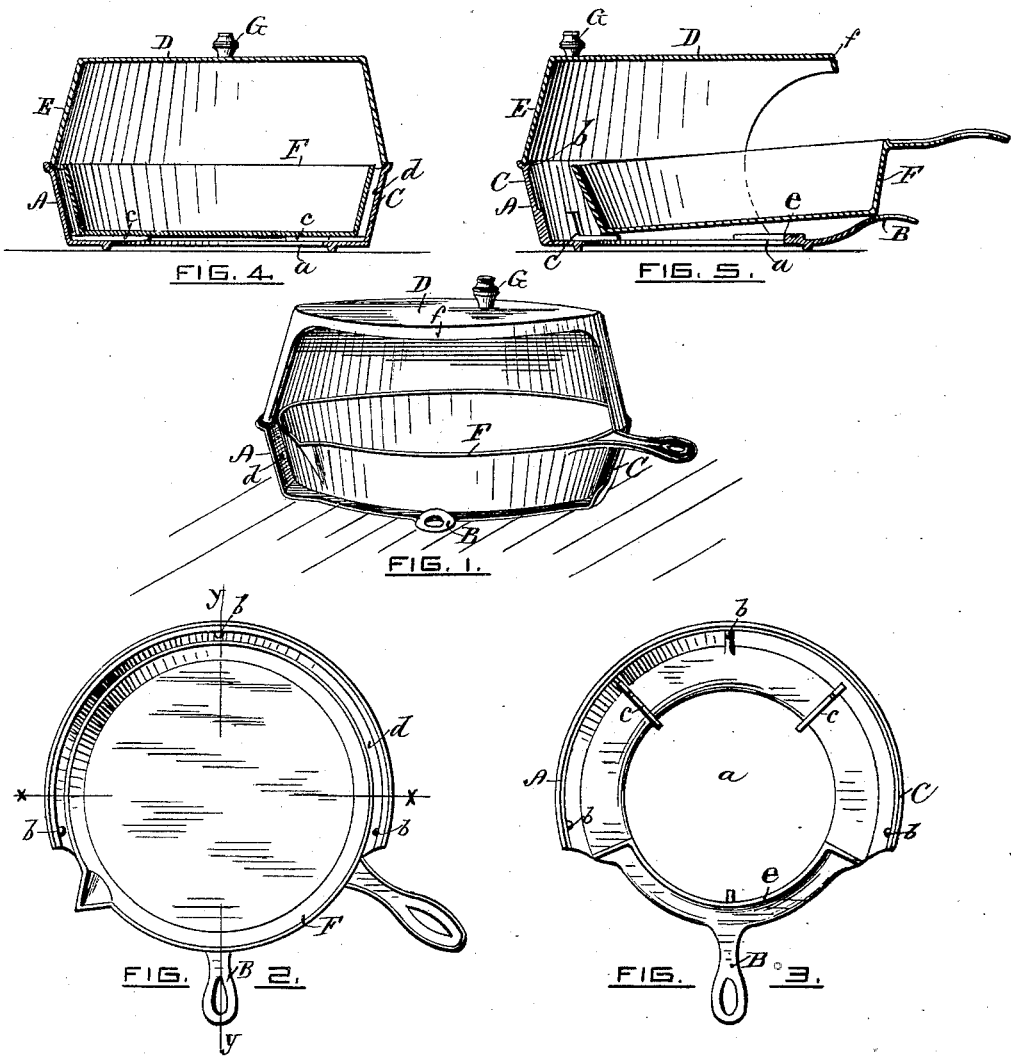
WITNESSES:
Chas. F. Schmelz
Joseph J. Scholfield
INVENTOR:
William Simmons,
James F. Sprague,
per S. Scholfield
Attorney (No Model.) 2 Sheets—Sheet 2.

W. SIMMONS & J. F. SPRAGUE.
DRAFT ATTACHMENT FOR FRYING PANS.

No. 333,894. Patented Jan. 5, 1886.

WITNESSES:
Chas. F. Schmitz
Lillie A. Eager

INVENTOR:
William Simmons
James F. Sprague
per S. Scholfield
Attorney

N. PETERS, Photo-Lithographer, Washington, D. C.

UNITED STATES PATENT OFFICE.

WILLIAM SIMMONS AND JAMES F. SPRAGUE, OF PROVIDENCE, RHODE ISLAND; SAID SPRAGUE ASSIGNOR TO SAID SIMMONS.

DRAFT ATTACHMENT FOR FRYING-PANS.

SPECIFICATION forming part of Letters Patent No. 333,894, dated January 5, 1886.

Application filed May 18, 1885. Serial No. 165,930. (No model.)

*To all whom it may concern:*

Be it known that we, WILLIAM SIMMONS and JAMES F. SPRAGUE, of Providence, in the State of Rhode Island, have invented an Improvement in Draft Attachments for Frying-Pans, of which the following is a specification.

In cooking upon a stove it is highly desirable to prevent the escape of the vapor and odor of the cooking material into the room, and various devices have been heretofore employed for conducting the same into the flue of the stove, such vapor collecting and conveying devices being especially desirable in frying and broiling; and our invention consists in the combination of a spider with a bonnet having a downwardly-turned edge, which is cut away at its front, so as to leave an overhanging central portion, whereby the ascending vapors will be arrested and be downwardly deflected into the draft-passages between the spider and the contained cooking-utensil, and an unobstructed opening will be had for the purpose of inspection and manipulation, as hereinafter fully set forth.

Figure 7:
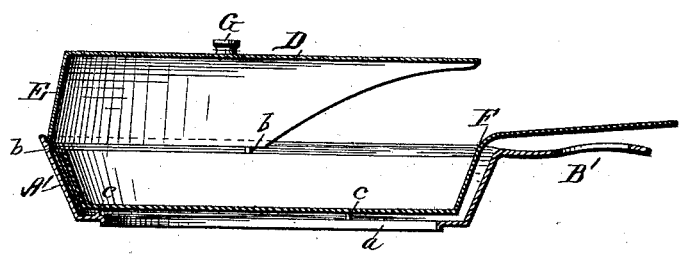
Figure 8:
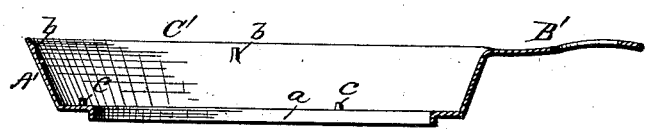

Figure 1 is a perspective view of our improved draft attachment with the frying-pan in position. Fig. 2 is a top view of the spider and frying-pan with the bonnet removed. Fig. 3 is a top view of the spider. Fig. 4 is a vertical section taken in the line $x\ x$ of Fig. 2. Fig. 5 is a vertical section taken in the line $y\ y$, with the frying-pan partially removed from the spider. Fig. 6 is a vertical section taken in the same line, showing the adaptation of the draft attachment for a broiler. Figs. 7 and 8 are sectional views illustrating a modification of our invention.

In the accompanying drawings, A is the spider, provided with an open space, $a$, adapted to fit over the ordinary kettle-opening in the top of a cooking-stove. B is the handle for the spider. C is an upwardly-directed flange extending for a portion of the circumference of the spider, and D is a bonnet having a downwardly-turned edge, E, cut away at one side, and thus made to correspond with the upward flange of the spider, upon which the downwardly-turned edge E of the bonnet D is made to rest, being retained in a suitable groove, or by means of projecting lugs $b$, arranged interiorly around the upper edge of the flange C. The bonnet D is also provided with a knob or handle, G, by means of which the bonnet may be readily removed from the spider as required.

The opening formed in the flange C of the spider is to be made of sufficient extent to allow the frying-pan F to be passed horizontally therein, and the corresponding opening in the edge of the bonnet D is also adapted for the passage of the frying-pan to and from its proper cooking position on the spider. The spider is provided with the inwardly-projecting lugs $c$, which serve to elevate the frying-pan F from the bottom of the interior surface of the spider, and prevent the same from contact with the inner surface of the flange C, thus forming an open passage, $d$, between the outer edge of the frying-pan and the inner side of the flange C, through which the vapors and odors arising from the cooking materials will be conducted downward by the draft into the fire-chamber or flue of the stove, from which it will pass to the chimney, and thus be effectually prevented from contaminating the air of the room. The slightly-raised rib or flange $e$, the top of which lies in the same horizontal plane with the top of the lugs $c$, serves to prevent the outer air from passing under the frying-pan, and thus lessening the proper draft around the edge of the same, and also from injuriously cooling the bottom of the pan. When the pan F is drawn partially back from under the bonnet, in order to fully inspect the cooking material, the handle B of the spider will serve to form a support for the pan, as shown in Fig. 5. The boiler H, Fig. 6, may also be inserted within the flange-opening in the spider and bonnet when it is desired to carry the smoke and odor from the broiling meat into the stove-flue, the broiler H resting upon the lugs $c$, and thus providing for a draft-passage under the edge of the broiler, as shown in the case of the frying-pan.

The open front portion of the bonnet D serves to allow the proper inspection and manipulation of the cooking materials, and the overhanging portion $f$ of the bonnet serves to arrest the rising vapors and deflect them downward into the draft-spaces and into the flue of the stove, as above described.

Our improved bonnet D may be used to advantage in combination with a spider having a continuous circular flange without having an opening therein for the horizontal removal of the cooking-utensil. We therefore do not limit our improvement to such openly-constructed spiders, although such a construction is preferred by us.

Our improvement is adapted for use not only upon wood or coal burning stoves, but also upon gas or oil stoves.

Fig. 8 shows a sectional view of a spider, A', having a bottom opening, a, adapted to register with the kettle-opening of a stove, and a continuous rim or flange, C', with a handle, B', extending outward from the upper edge of the rim. The spider A' is provided with the inwardly-projecting lugs b, which serve to support the lower edge of the flange E of the bonnet D, which is made to register with the curve of the upper edge of the rim C', and in this case the frying-pan F may be raised over the rim C' of the spider, and then withdrawn from under the projecting bonnet D.

We claim as our invention—

1. The combination of a circular spider, provided with an opening adapted to register with the kettle-opening of the stove, with the inwardly-projecting lugs, and a handle for the convenient manipulation of the spider, the handled cooking-utensil of less diameter than the spider, and supported by the projecting lugs of the same, forming the required downward-draft passages, and the covering-bonnet made to fit upon the rim of the spider, the said bonnet being open at its front portion, and made to circularly project over the front upper portion of the cooking-utensil, whereby the cooking materials can be inspected and manipulated and the said cooking-utensil inserted or removed without necessitating the removal of the bonnet from its seat on the rim of the spider, substantially as described.

2. The combination of the spider A, provided with an opening, a, adapted to register with the kettle-opening of a stove, and with an upward flange, C, extending partially around the spider, inwardly-projecting lugs c, raised portion e, and handle B, the cooking-utensil F, and the bonnet D, registering with the flange C, and provided with an overhanging portion, f, which forms with the spider an opening through which the cooking-utensil can be passed without necessitating the removal of the bonnet from its seat on the rim of the spider, substantially as described.

WILLIAM SIMMONS.
JAMES F. SPRAGUE.

Witnesses:
SOCRATES SCHOLFIELD,
JOSEPH J. SCHOLFIELD.